United States Patent
Lv et al.

(10) Patent No.: US 10,601,581 B2
(45) Date of Patent: Mar. 24, 2020

(54) METHOD AND APPARATUS FOR IMPLEMENTING SECURITY OF BROADBAND BUS ARCHITECTURE IN INDUSTRIAL INTERNET FIELD

(71) Applicant: KYLAND TECHNOLOGY CO., LTD., Beijing (CN)

(72) Inventors: Zhiyong Lv, Beijing (CN); Yi Huang, Beijing (CN); Hao Cao, Beijing (CN)

(73) Assignee: KYLAND TECHNOLOGY CO., LTD., Beijing (CN)

( * ) Notice: Subject to any disclaimer, the term of this patent is extended or adjusted under 35 U.S.C. 154(b) by 286 days.

(21) Appl. No.: 15/858,816

(22) Filed: Dec. 29, 2017

(65) Prior Publication Data

US 2019/0089524 A1 Mar. 21, 2019

(30) Foreign Application Priority Data

Sep. 20, 2017 (CN) .......................... 2017 1 0854843

(51) Int. Cl.
| | |
|---|---|
| *H04L 29/06* | (2006.01) |
| *H04L 9/06* | (2006.01) |
| *H04L 9/08* | (2006.01) |
| *G05B 19/418* | (2006.01) |
| *G05B 15/02* | (2006.01) |

(Continued)

(52) U.S. Cl.
CPC ............... *H04L 9/06* (2013.01); *G05B 15/02* (2013.01); *G05B 19/4185* (2013.01); *G06F 13/4291* (2013.01); *H04B 3/544* (2013.01); *H04L 9/0825* (2013.01); *H04L 12/40032* (2013.01); *H04L 41/0686* (2013.01); *H04L 63/0442* (2013.01); *H04L 5/0042* (2013.01);
(Continued)

(58) Field of Classification Search
None
See application file for complete search history.

(56) References Cited

U.S. PATENT DOCUMENTS

| 2006/0174102 A1* | 8/2006 | Smith ................. H04L 12/2803 713/150 |
| 2014/0169425 A1* | 6/2014 | Kolze .................. H04L 5/0007 375/222 |
| 2015/0244632 A1* | 8/2015 | Katar ................. H04L 47/2433 370/230 |

OTHER PUBLICATIONS

Wen Yang et al., "Cyber Security Issues of Critical Components for Industrial Control System", Proceedings of 2014 IEEE Chinese Guidance, Navigation and Control Conference, Aug. 8-10, 2014, pp. 2698-2703, IEEE.

* cited by examiner

*Primary Examiner* — Andrew J Steinle
(74) *Attorney, Agent, or Firm* — Arent Fox LLP; Michael Fainberg

(57) ABSTRACT

Disclosed are a method and apparatus for implementing security of broadband bus architecture in industrial internet field. The security of the access process can be guaranteed by encrypting data transmitted between the bus terminal and the bus controller; the operation of the entire system can be prevented from threat of abnormal data by performing security detection on the acquired data; it can be easy to treat abnormal conditions of the transport rule by the bus controller by monitoring and reporting the transport rule of the data flow over the bus by a bus terminal; and the reliability of the transmission process may be improved by interleaving the to-be-sent data at the bus controller and the bus terminal; the time delay of the data transmission resulting from the addition of the interleaving processes can also be reduced to have high transmission rate.

16 Claims, 8 Drawing Sheets

(51) Int. Cl.
*H04B 3/54* (2006.01)
*G06F 13/42* (2006.01)
*H04L 12/40* (2006.01)
*H04L 12/24* (2006.01)
H04L 5/00 (2006.01)
H04L 29/08 (2006.01)

(52) U.S. Cl.
CPC .......... *H04L 63/0428* (2013.01); *H04L 67/12* (2013.01); *Y02P 90/18* (2015.11)

METHOD AND APPARATUS FOR IMPLEMENTING SECURITY OF BROADBAND BUS ARCHITECTURE IN INDUSTRIAL INTERNET FIELD

CROSS REFERENCE TO RELATED APPLICATION

This application claims priority to Chinese Patent Application No. 201710854843.1, filed with the Chinese Patent Office on Sep. 20, 2017. The entire disclosure of the above application is incorporated herein by reference.

FIELD

The present invention relates to the field of industrial Internet technology, and particularly to a method and apparatus for implementing security of broadband bus architecture in industrial internet field.

BACKGROUND

In the domain of the industrial field, with increasing scale of the industrial field, industrial field equipments become more complex and diverse. With reference to the schematic diagram of an implementing system for an industrial Internet field broadband bus architecture shown in FIG. 1, the implementing system includes a bus controller, at least one bus terminal and a two-wire bus, the bus controller and the bus terminal are connected via the two-wire bus to construct a network; and communication is realized between the bus controller and any of the bus terminals and between the bus terminals based on a multi-carrier orthogonal frequency division multiplexing (OFDM) technology. Different sub-carriers are occupied by the respective bus terminals and the sub-carriers occupied by the respectively bus terminals do not interfere with each other.

The inventor has found that in the traditional industrial Internet field broadband bus architecture, to increase the transmission rate between the bus terminal and the bus controller and between these bus terminals is considered as a primary objective, but the security risk which possibly occurs during data transmission is ignored. Moreover, due to the presence of signal fading in channel transmission between the bus terminal and the bus controller and between these terminals, concentrated errors may abruptly occur, resulting in severe loss of transmitted data and thus relative low reliability in data transmission between the bus terminal and bus controller and between the bus terminals.

Thus, in the prior art there is the problem of relatively low security and reliability in data transmission between a bus terminal and a bus controller in an implementing system for an industrial Internet field broadband bus architecture.

SUMMARY

The present invention provides a method and apparatus for implementing security of broadband bus architecture in industrial Internet field, for solving the problem of relatively low security and reliability in data transmission between a bus terminal and a bus controller in an implementing system for an industrial Internet field broadband bus architecture.

Particular technical solutions according to the embodiments of the present invention are as follows.

In a first aspect, a method for implementing security of broadband bus architecture in industrial internet field is provided. The method includes:

sending, by a bus controller, configuration information to a bus terminal, where the configuration information is encrypted according to pre-stored encryption information of the bus terminal;

receiving, by the bus controller, response information which is sent from the bus terminal and is encrypted according to pre-stored encryption information of the bus controller, and after decrypting the response information according to pre-stored decryption information of the bus controller and determining that the bus terminal finishes configuration, allocating a channel resource block for data transmission to the bus terminal, wherein the response information is sent by the bus terminal after the bus terminal decrypts the configuration information according to decryption information of the bus terminal and finishes the configuration according to the configuration information; and sending, by the bus controller, to-be-sent data interleaved by a pre-set interleaver to the bus terminal, according to the channel resource block allocated to the bus terminal, where the to-be-sent data are serially written into at least one storage unit of the interleaver according to a pre-set first rule and parallelly output from the at least one storage unit according to a pre-set second rule.

In a second aspect, a method for implementing security of broadband bus architecture in industrial Internet field is provided. The method includes:

receiving, by a bus terminal, configuration information sent from a bus controller, wherein the configuration information is encrypted by the bus controller according to pre-stored encryption information of the bus terminal;

decrypting, by the bus terminal, the configuration information according to pre-stored decryption information of the bus terminal, and after finishing configuration according to the configuration information, sending, by the bus terminal, to the bus controller response information encrypted according to pre-stored encryption information of the bus controller;

receiving, by the bus terminal, information of channel resource block which is allocated by the bus controller to the bus terminal, wherein the information of channel resource block is sent by the bus controller after the bus controller decrypts the response information according to pre-stored decryption information of the bus controller and determines that the bus terminal finishes the configuration; and sending, by the bus terminal, to-be-sent data interleaved by a pre-set interleaver to the bus controller, according to the received information of channel resource block, wherein the to-be-sent data are serially written into at least one storage unit of the interleaver according to a pre-set first rule and parallelly output from the at least one storage unit according to a pre-set second rule.

In a third aspect, an apparatus for implementing security of broadband bus architecture in industrial internet field is provided. The apparatus includes:

a first sending module, configured to send configuration information to a bus terminal, wherein the configuration information is encrypted according to pre-stored encryption information of the bus terminal;

a processing module, configured to receive response information which is sent from the bus terminal and is encrypted according to pre-stored encryption information of a bus controller, and after the response information is decrypted according to pre-stored decryption information of the bus controller and it is determined that the bus terminal finishes configuration, to allocate a channel resource block for data transmission to the bus terminal, wherein the response information is sent by the bus terminal after the bus terminal decrypts the configuration information according to decryption information of the bus terminal and finishes the configuration according to the configuration information; and a second sending module, configured to send to-be-sent data interleaved by a pre-set interleaver to the bus terminal, according to the channel resource block allocated to the bus terminal, wherein the to-be-sent data are serially written into at least one storage unit of the interleaver according to a pre-set first rule and parallelly output from the at least one storage unit according to a pre-set second rule.

In a fourth aspect, an apparatus for implementing the security of broadband bus architecture in industrial internet field is provided. The apparatus includes:

a first receiving module, configured to receive configuration information sent from a bus controller, wherein the configuration information is encrypted by the bus controller according to pre-stored encryption information of the bus terminal;

a processing module, configured to decrypt the configuration information according to pre-stored decryption information of the bus terminal, and after the configuration is finished according to the configuration information, to send to the bus controller response information encrypted according to pre-stored encryption information of the bus controller;

a second receiving module, configured to receive information of channel resource block which is allocated by the bus controller to the bus terminal, wherein the information of channel resource block is sent by the bus controller after the bus controller decrypts the response information according to pre-stored decryption information of the bus controller and determines that the bus terminal finishes the configuration;

a sending module, configured to, send to-be-sent data interleaved by a pre-set interleaver to the bus controller, according to the received information of channel resource block, wherein the to-be-sent data are serially written into at least one storage unit of the interleaver according to a pre-set first rule and parallelly output from the at least one storage unit according to a pre-set second rule.

In a fifth aspect, a computer-readable storage medium having a computer program stored thereon, where the computer program, when executed by a processor, implements the steps of any of the methods for implementing security of broadband bus architecture in industrial Internet field according to the foregoing first aspect.

In a sixth aspect, a computer device, where the computer device includes a processor, the processor is configured to, when executing a computer program stored in a memory, implement the steps of any of the methods for implementing security of broadband bus architecture in industrial Internet field according to the foregoing first aspect.

In a seventh aspect, a computer-readable storage medium having a computer program stored thereon, wherein the computer program, when executed by a processor, implements the steps of any of the methods for implementing security of broadband bus architecture in industrial Internet field according to the foregoing second aspect.

In an eighth aspect, a computer device, wherein the computer device includes a processor, and the processor is configured to, when executing a computer program stored in a memory, implement the steps of any of the methods for implementing security of broadband bus architecture in industrial Internet field according to the foregoing second aspect.

BRIEF DESCRIPTION OF THE DRAWINGS

FIG. 6A shows a first schematic diagram of the written data in each of storage units of the interleaver.

FIG. 6B shows a second schematic diagram of the written data in each of storage units of the interleaver.

DETAILED DESCRIPTION OF THE EMBODIMENTS

The technical solutions in the embodiments of the present invention will be clearly and fully described in conjunction with the following accompanying drawings. Obviously, the described embodiments are only some but not all of embodiments of the present invention. Based on the embodiments of the present invention, all other embodiments obtained by those of ordinary skill without paying creative work are within the scope of protection of the present invention.

To solve problems with relative low security and relative low reliability in data transmission between the bus terminal and bus controller in the industrial Internet field broadband bus architecture, the embodiments of the present invention provides a data transmission solution that is capable of realizing high-speed, high-security and high-reliability data transmission. In this method, the security of the access process can be guaranteed by encrypting data transmitted between the bus terminal and the bus controller; the operation of the entire system can be prevented from threat of abnormal data by performing security detection on the acquired data; it can be easy to treat abnormal conditions of the transport rule by the bus controller by monitoring and reporting the transport rule of the data flow over the bus by a bus terminal; and the reliability of the transmission process may be improved by interleaving the to-be-sent data at the bus controller and the bus terminal. Moreover, during interleaving process, by parallelly outputting the to-be-sent data from the interleaver, the time delay of the data transmission resulting from the addition of the interleaving processes can also be reduced, thus guaranteeing high-speed transmission between the bus terminal and the bus controller.

The present invention will be described below in detail in conjunction with specific embodiments; of course, the present invention is not limited to those embodiments.

Figure 1:
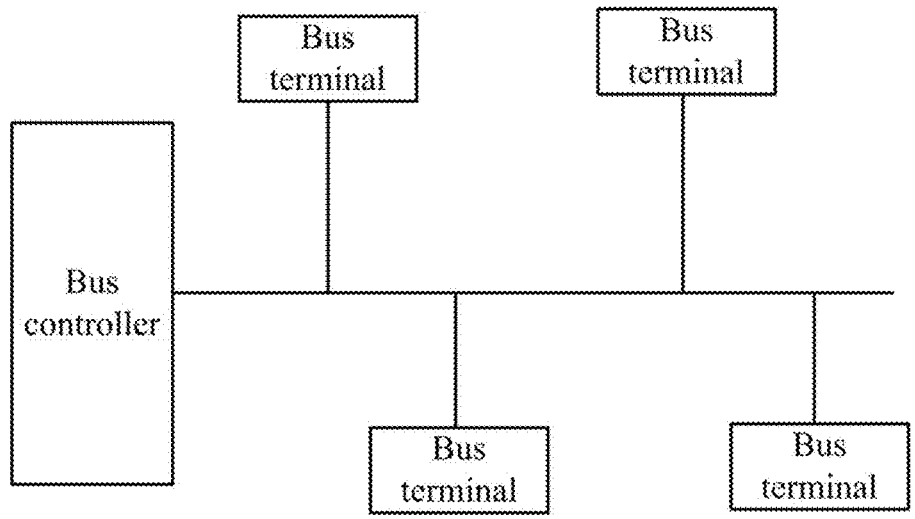
FIG. 1 shows a schematic diagram of an implementing system for an industrial Internet field broadband bus architecture.
Figure 2:
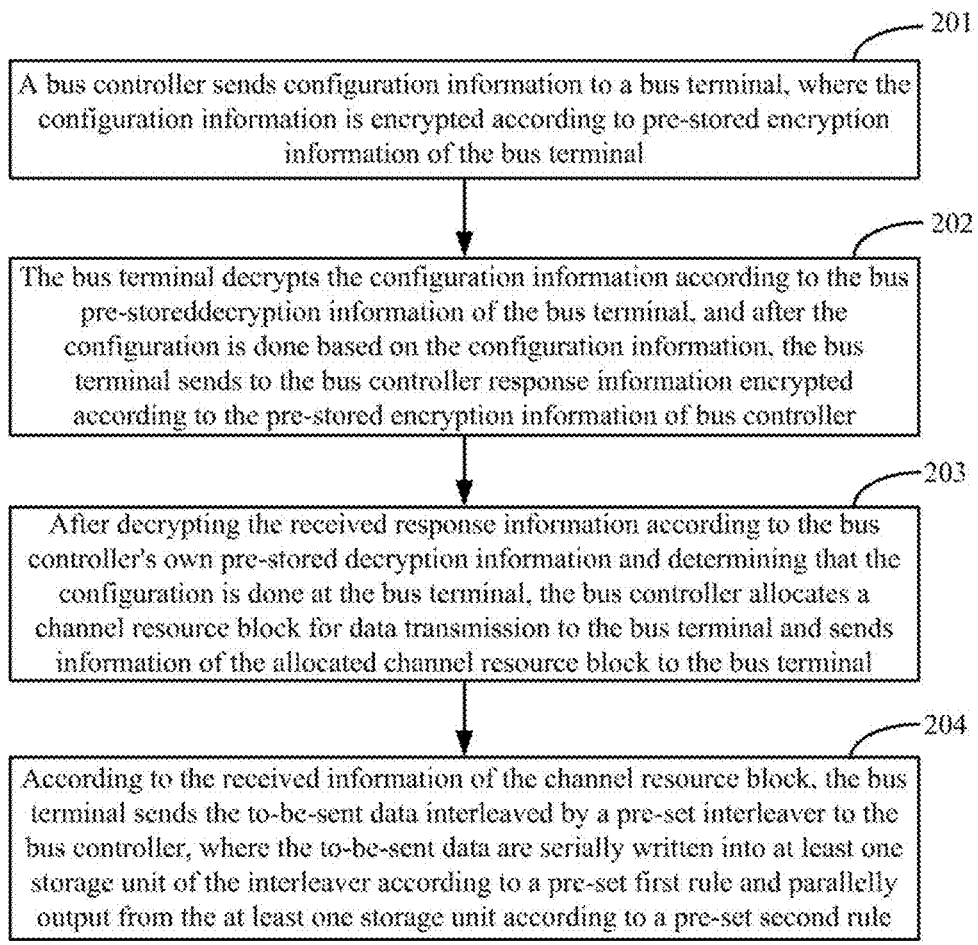
FIG. 2 shows a flowchart of a method for implementing security of broadband bus architecture in industrial Internet field according to an embodiment of the present invention.

Reference is made to FIG. 2, which shows a flowchart of the method for implementing security of broadband bus architecture in industrial Internet field according to an embodiment of the present invention, and the method includes the following steps.

Step 201: a bus controller sends configuration information to a bus terminal, where the configuration information is encrypted according to pre-stored encryption information of the bus terminal.

Here, the bus controller may configure in advance its own encryption and decryption information, and the encryption information for various bus terminals in the system. Accordingly, various bus terminals in the system may also configure in advance their own encryption and decryption information, and the encryption information for the bus controller. In a specific implementation, the encryption information and decryption information of the bus controller or the bus terminal may be implemented in a form of a public and private key pair; of course, in a practical application, other keys may be used as the encryption information and decryption information of the bus controller or the bus terminal, and no limitation is made thereto in the present application.

In one or more embodiment, the bus controller sends the configuration information to the bus terminal by sending a broadcast message to at least one of bus terminals. Here, the broadcast message contains the identifier(s) of the at least one of bus terminals and the configuration information corresponding to the identifier(s) of the at least one of bus terminals. The configuration information for a bus terminal is encrypted according to the pre-stored encryption information of the bus terminal; the identifier of the bus terminal is used to indicate the bus terminal to obtain, according to the decryption information of the bus terminal and the identifier of the bus terminal, the configuration information corresponding to the identifier of the bus terminal from the broadcast message.

Further, before the bus controller sends the configuration information to the bus terminal, the method also includes: the bus controller receives an access request from the bus terminal, where access request is encrypted according to the encryption information of the bus controller. After decrypting the access request by the bus controller's own decryption information, the bus controller allocates an identifier to the bus terminal if it is determined that no identifier for the bus terminal is included in the access request.

Step 202: the bus terminal decrypts the configuration information according to the bus pre-stored decryption information of the bus terminal, and after the configuration is done based on the configuration information, the bus terminal sends to the bus controller response information encrypted according to the pre-stored encryption information of bus controller.

Step 203: after decrypting the received response information according to the bus controller's own pre-stored decryption information and determining that the configuration is done at the bus terminal, the bus controller allocates a channel resource block for data transmission to the bus terminal and sends information of the allocated channel resource block to the bus terminal.

Step 204: according to the received information of the channel resource block, the bus terminal sends the to-be-sent data interleaved by a pre-set interleaver to the bus controller, where the to-be-sent data are serially written into at least one storage unit of the interleaver according to a pre-set first rule and parallelly output from the at least one storage unit according to a pre-set second rule.

Here, an interleaver can be pre-set in the bus terminal. The interleaver is an element that can change the structure of information to the full extend without changing the content of the information, so that the concentrated errors that abruptly occur during data transmission may be discretized to the full extend, thus improving the reliability of the data transmission between the bus terminal and the bus controller.

Specifically, the to-be-sent data are serially written into at least one storage unit of the interleaver according to a first rule may be performed by: writing the to-be-sent data in a set number of bits which are output within each pre-set clock cycle into different storage units in sequence.

Specifically, the to-be-sent data are parallelly output from the at least one storage unit according to a pre-set second rule may be performed by: within each clock cycle, the to-be-sent data in a set number of bits are read respectively from the different storage units and the data corresponding to specified bit positions are extracted respectively from the data read from the different storage units and output.

Here, that according to the received information of the channel resource block, the bus terminal sends the to-be-sent data interleaved by a pre-set interleaver to the bus controller may include the following steps:

the bus terminal detects acquired data during data acquisition;

if it is determined that the acquired data is normal data, then the bus terminal sends the normal data which are interleaved by the pre-set interleaver to the bus controller according to the information of channel resource block;

if it is determined that the acquired data is suspect data, then the bus terminal marks the suspect data and sends the marked suspect data which are interleaved by the pre-set interleaver to the bus controller according to the channel resource block information; and if it is determined that the acquired data are abnormal data, then the bus terminal locally processes the acquired abnormal data.

Here, that according to the received information of the channel resource block, the bus terminal sends the to-be-sent data interleaved by a pre-set interleaver to the bus controller may include the following steps:

if data transmission is performed between the bus terminal and the bus controller and between various bus terminals based on Orthogonal Frequency Division Multiplexing (OFDM) technology, then the bus terminal monitors the sub-carriers occupied by the bus terminal and other bus terminals during the data transmission; and if it is determined that any of the other bus terminals occupies the same sub-carrier as the bus terminal or at least two of the other bus terminals occupy the same sub-carrier during the data transmission, then the bus terminal sends alert information interleaved by the pre-set interleaver to the bus controller, where the alert information is used to notify the bus controller that an abnormality occurs during the current data transmission.

In addition, in a specific implementation, an interleaver may also pre-set in the bus controller, and then the bus controller may also send the to-be-sent data interleaved by a pre-set interleaver to a bus terminal based on the channel resource block allocated to the bus terminal. Moreover, the to-be-sent data can be serially written into at least one storage unit of the interleaver according to a first rule and parallelly output from the at least one storage unit according to a pre-set second rule. Here serially writing the to-be-sent data by the bus terminal to the interleaver and parallelly outputting the to-be-sent data from the interleaver may be performed with reference to the above description of the bus terminal serially writting the to-be-sent data to the interleaver and parallelly outputting the to-be-sent data from the interleaver, which will not be described in detail herein.

In the embodiments of the present invention, to improve the security for the data transmission between the bus terminal and the bus controller, in the implementing system for the industrial Internet field broadband bus architecture, access verification can be introduced into the process in which the bus terminal accesses the bus controller. The data can be encrypted and transmitted between the bus terminal and the bus controller so that the security of the access process is guaranteed.

Further, after a bus terminal accesses the bus controller, to guarantee the security for the communication process between the bus terminal and the bus controller, the bus terminal can detect acquired data in a manner of acquisition verification by analyzing the detection result, determine the mode in which data is treated according to the detection result so as to prevent the threat of the abnormal data to the entire system.

Moreover, during the data transmission between the bus terminal and the bus controller, the bus terminal may monitor the transport rule of a data flow over the bus by transport verification, here the transport rule, for example, can be the rule in which a sub-carrier in the OFDM is allocated for each bus terminal. Further, the bus terminal reports an abnormity condition in time to the bus controller after an abnormity occurs in the transport rule of the data flow is detected, so that the abnormal condition of the transport rule can be handled by the bus controller, thus improving the security for the data transmission between the bus terminal and the bus controller.

Of course, in a specific implementation, the bus controller may also perform the transport verification, so as to monitor the transport rule of the data flow over the bus and treat any abnormal condition of the transport rule after the abnormity occurs in the transport rule of the data flow is detected. In the embodiments of the present invention, to reduce the data processing load on the bus controller for the data transmission between the bus controller and various bus terminals, the transport verification process is preferably performed by the bus terminals. Moreover, in an embodiment of the present invention, in the industrial Internet field broadband bus architecture, the transport rule of data flow over the bus may be monitored by each of the bus terminals or a specified bus terminal, and no limitation is made thereto in the present application.

Figure 3:
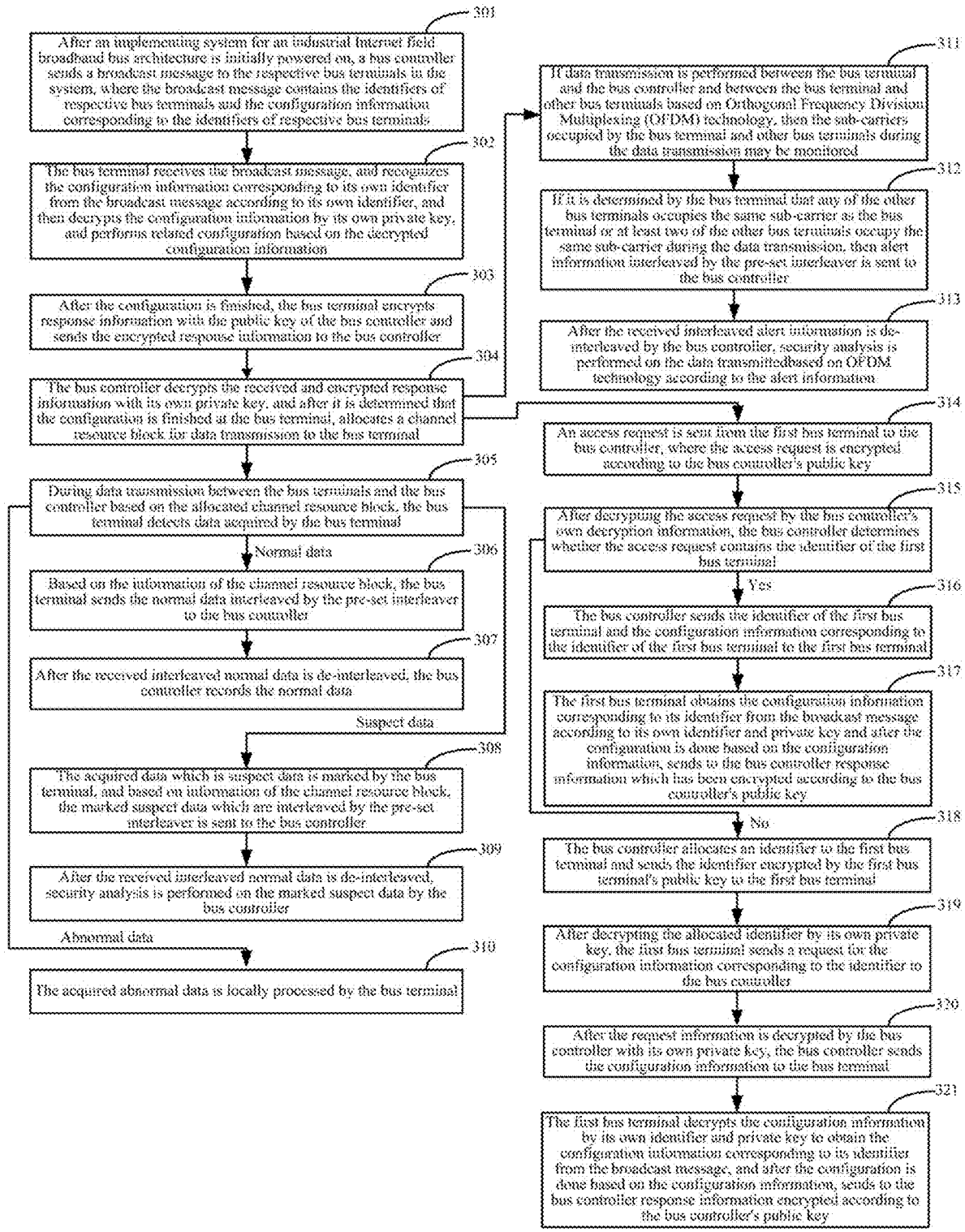
FIG. 3 shows a flowchart illustrating access verification, acquisition verification and transport verification between a bus terminal and a bus controller in an implementing system for an industrial Internet field broadband bus architecture according to an embodiment of the present invention.

For convenience and ease of understanding of the embodiments of the present invention, with reference to FIG. 3, the access verification, acquisition verification and transport verification between a bus terminal and a bus controller in an implementing system for an industrial Internet field broadband bus architecture will be discussed below in detail by following the specific process.

Step 301: after an implementing system for an industrial Internet field broadband bus architecture is initially powered on, a bus controller sends a broadcast message to the respective bus terminals in the system, where the broadcast message contains the identifiers of respective bus terminals and the configuration information corresponding to the identifiers of respective bus terminals.

Here, the bus controller may have its own public and private keys and the public keys for the respective bus terminals configured in advance. In a specific implementation, for the configuration information for each of the bus terminals, the bus controller may use the public key for the bus terminal to encrypt the configuration information for the bus terminal, and then carry and send the identifiers of respective bus terminals and the encrypted configuration information corresponding to the identifiers of respective bus terminals in a broadcast message.

Here, a unique identifier may be allocated in advance to each of the bus terminals in the system by the bus controller and informed to the respective bus terminal, so that the bus terminal can obtain the content corresponding to its own identifier from the broadcast message sent from the bus controller.

Here, the bus controller may obtain the configuration information for the respective bus terminals from a local database or from a network side server. The configuration information contains various parameters required for the bus terminal to access the bus controller.

Step 302: the bus terminal receives the broadcast message, and recognizes the configuration information corresponding to its own identifier from the broadcast message according to its own identifier, and then decrypts the configuration information by its own private key, and performs related configuration based on the decrypted configuration information.

Here, the bus terminal described may be any of the bus terminals in the system which receives the broadcast message.

Moreover, the bus terminals have its own public and private keys and the public keys for the bus controller configured in advance.

Step 303: after the configuration is finished, the bus terminal encrypts response information with the public key of the bus controller and sends the encrypted response information to the bus controller.

Step 304: the bus controller decrypts the received and encrypted response information with its own private key, and after it is determined that the configuration is finished at the bus terminal, allocates a channel resource block for data transmission to the bus terminal.

Here, the bus controller may allocate a channel resource block to the bus terminals according to the traffic transfer demand of the bus terminals and send information of the allocated channel resource block to the bus terminal.

Figure 4A:
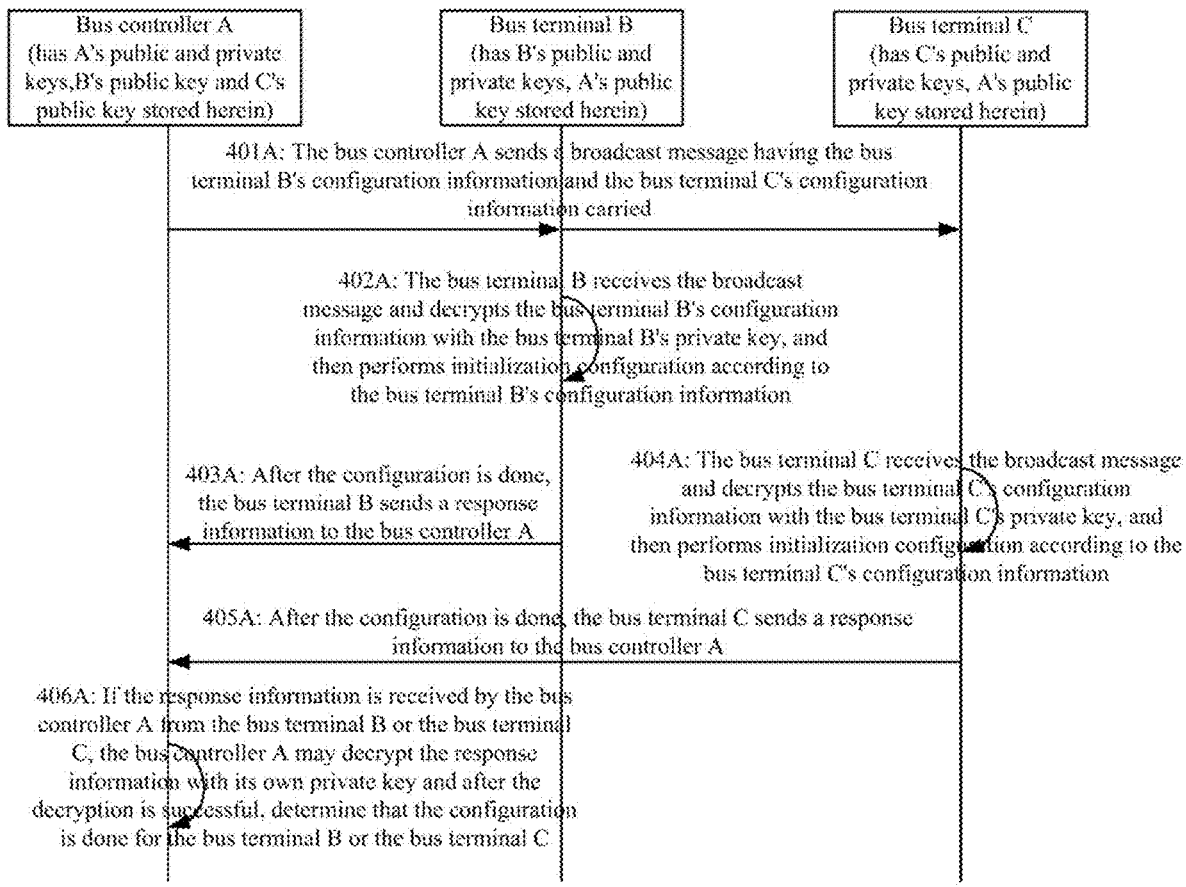
FIG. 4A shows a schematic diagram depicting an access verification process according to an embodiment of the present invention.

Here, for convenience and ease of understanding of the embodiments of the present invention, the access verification process described above in Steps 301 to 304 is exemplified, specifically with reference to FIG. 4A.

Assuming that the implementing system for the industrial Internet field broadband bus architecture includes a bus controller A, a bus terminal B and a bus terminal C. The bus controller A has A's public and private keys, B's public key and C's public key pre-stored herein; the bus terminal B has B's public and private keys, A's public key pre-stored herein; and the bus terminal C has C's public and private keys, A's public key pre-stored herein.

During the initialization stage of the system, the process of information exchange between the bus controller A and the bus terminals B and C is as follows.

Step 401A: the bus controller A sends a broadcast message carrying the bus terminal B's configuration information and the bus terminal C's configuration information.

Here, the bus terminal B's configuration information is encrypted according to the bus terminal B's public key, and the bus terminal C's configuration information is encrypted according to the bus terminal C's public key.

Step 402A: the bus terminal B receives the broadcast message and decrypts the bus terminal B's configuration information by the bus terminal B's private key, and then performs initialization configuration according to the bus terminal B's configuration information.

Step 403A: after the configuration is finished, the bus terminal B sends response information to the bus controller A.

Here, the response information is encrypted according to the bus controller A's public key.

Step 404A: the bus terminal C receives the broadcast message and decrypts the bus terminal C's configuration information by the bus terminal C's private key, and then performs initialization configuration according to the bus terminal C's configuration information.

Step 405A: after the configuration is finished, the bus terminal C sends response information to the bus controller A.

Here the response information is encrypted according to the bus controller A's public key.

It shall be noted that the above described steps 402A-403A and steps 404A-405A may be performed in any order.

Step 406A: if the response information is received by the bus controller A from the bus terminal B or the bus terminal C, the bus controller A may decrypt the response information by its own private key and after the decryption is successful, determine that the configuration is done for the bus terminal B or the bus terminal C.

Until this point, the bus terminal(s) has/have successfully access the bus controller and the access process of the system initialization is completed. Subsequently, data can be transmitted between the bus terminals and the bus controller based on the allocated channel resource block. In a practical application, during data transmission between the bus terminals and the bus controller, the bus controller can periodically initiate the above described access verification process and may disconnect the data communication with any abnormal bus terminal if it is determined that there is the abnormal access for the bus terminal.

Moreover, to improve the reliability of the data transmission between the bus terminals and the bus controller, an interleaving and de-interleaving process may be employed to implement data sending and receiving. Specifically, during data transmission between the bus controller and the bus terminals and between the respective bus terminals, the bus controller may send to-be-sent data to a bus terminal after the to-be-sent data is interleaved through a pre-set interleaver; after the interleaved data is received by the bus terminal, the data is de-interleaved and restored for subsequent processing. Accordingly, the bus terminal may also send to-be-sent data to the bus controller or other bus terminals after the to-be-sent data is interleaved through a pre-set interleaver; and after the interleaved data is received by the bus controller or other bus terminals, the data may also be de-interleaved and restored for subsequent processing.

Step 305: during data transmission between the bus terminals and the bus controller based on the allocated channel resource block, the bus terminal detects data acquired by the bus terminal.

Here, the bus terminal may perform big data analytics on the acquired data, and create table entries, such as a data type, a normal data range for each data type and an executing action.

Specifically, when it is detected that data of certain type fall within a normal range, it can be determined that the data of the certain type is normal data, and the executing action is "passed", and further, perform Steps 306-307.

If it is detected that data of certain type is beyond the normal range and the exceeded portion is within an allowable range, then it can be determined that the data of the certain type is suspect data, and the executing action is "passed" and further, perform Steps 308-309.

If it is detected that data of certain type is beyond the normal range and the exceeded portion is out of the allowable range, then it can be determined that the data of the certain type is abnormal data, and the executing action is "discard" and further, perform Step 310.

Step 306: based on the information of the channel resource block, the bus terminal sends the normal data interleaved by the pre-set interleaver to the bus controller.

Here, in a practical application, it may also be determined by the bus terminal based on the data type as to whether the acquired normal data needs to be sent; if it is determined that there is no need to send the acquired data, a log is recorded based on the acquired normal data and the acquired normal data is discarded after the recording is completed.

Step 307: after the received interleaved normal data is de-interleaved, the bus controller records the normal data.

Step 308: the acquired data which is suspect data is marked by the bus terminal, and based on information of the channel resource block, the marked suspect data which are interleaved by the pre-set interleaver is sent to the bus controller.

Step 309: after the received interleaved normal data is de-interleaved, security analysis is performed on the marked suspect data by the bus controller.

Here, the security analysis may be performed on the marked suspect data by the bus controller based on a deep packet inspection technology. For a specific deep packet inspection technology, the existing process may be referred to and will not be repeatedly described in the embodiment.

In a specific implementation, if in the security analysis on the marked suspect data, it is determined that the marked suspect data are abnormal data, then the channel for communication with the bus terminal sending the marked suspect data may be closed and no longer data transmission is performed, so that the influence of the abnormal bus terminal on the operation of the bus controller or other bus terminals is avoided.

Step 310: the acquired abnormal data is locally processed by the bus terminal.

Specifically, the bus terminal may determine how to process the acquired abnormal data based on the data type. For example, for the data which reflect that the operation of the bus terminal is abnormal, the channel for communication with the bus controller or with other bus terminals may be closed automatically upon determining that the acquired data is abnormal, so that the influence on the operation of the bus controller or other bus terminals is avoided. For some data which become abnormal due to change of environmental factors, the bus terminal may simply discard the abnormal data and continues to operate.

It can be seen from Steps 305-310 that, in the embodiments of the present invention, by using acquisition verification, the security for the data transmission between the bus terminals and the bus controller can be guaranteed.

To further improve the security of the communication process between the bus terminals and the bus controller, the bus terminals may also perform transport verification for the transmission process between the bus controller and various bus terminals meanwhile performing acquisition verification. For details, see Steps 311-313.

Step 311: if data transmission is performed between the bus terminal and the bus controller and between the bus terminal and other bus terminals based on Orthogonal Frequency Division Multiplexing (OFDM) technology, then the sub-carriers occupied by the bus terminal and other bus terminals during the data transmission may be monitored.

Step 312: if it is determined by the bus terminal that any of the other bus terminals occupies the same sub-carrier as the bus terminal or at least two of the other bus terminals occupy the same sub-carrier during the data transmission, then alert information interleaved by the pre-set interleaver is sent to the bus controller.

Here, the alert information is used to notify the bus controller that an abnormality occurs during the current data transmission.

Step 313: after the received interleaved alert information is de-interleaved by the bus controller, security analysis is performed on the data transmitted based on OFDM technology according to the alert information.

Here, a data transport rule, such as the number of the sub-carriers occupied by each of the bus terminals may be adjusted according to the result of the security analysis and a practical application context, which is not described in detail herein.

Moreover, in a specific implementation, each bus terminal in the system may monitor the sub-carriers occupied by the bus terminal itself and other bus terminals, and in order to reduce the power consumption of the respective bus terminals as much as possible, a bus terminal can be dedicated to implement monitoring for the sub-carriers occupied by the respective bus terminals and reporting an alarm in an abnormal transmission condition.

It should be noted that, in the embodiments of the present invention, the acquisition verification in Steps 305-310 and the transport verification in Steps 311-313 may be specifically executed in any order.

In addition, during data transmission between the bus terminal and the bus controller based on the allocated channel resource block, it is possible for other bus terminals to request for accessing the bus controller. In such scenario, the access verification may also be applied and a specific implementing process is described below in detail.

It should be noted that, in order to differentiate the bus terminal that newly request access to the bus controller from those in the system that have accessed the bus controller, the bus terminal that newly requests access to the bus controller is referred to as the first bus terminal, for the convenience sake of description.

Step 314: an access request is sent from the first bus terminal to the bus controller, where the access request is encrypted according to the bus controller's public key.

Here, the first bus terminal may refer to the one which is deployed but not accessed the bus controller after the system powers on, or may be the one which has been deployed and accessed the bus controller but disconnected from the bus controller. At this point, the bus controller has allocated an identifier to the first bus terminal and the first bus terminal has known its own identifier. Thus, in that case, the access request sent from the first bus terminal to the bus controller contains the identifier if the first bus terminal.

In addition, the first bus terminal may also be the one newly deployed in the system. At this point, the bus controller has not yet allocated an identifier to the first bus terminal. Thus, the access request sent from the first bus terminal to the bus controller does not contain identifier of the first bus terminal and the first bus terminal may send an access request containing its address to the bus controller.

Step 315: after decrypting the access request by the bus controller's own decryption information, the bus controller determines whether the access request contains the identifier of the first bus terminal.

if it is determined that the access request contains the identifier of the first bus terminal, then perform Steps 316-317 are performed; otherwise, then perform Steps 318-321.

Step 316: the bus controller sends the identifier of the first bus terminal and the configuration information corresponding to the identifier of the first bus terminal to the first bus terminal.

Here, the bus controller may send the identifier of the first bus terminal and the configuration information corresponding to the identifier of the first bus terminal in a broadcast message, and the configuration information corresponding to the identifier of the first bus terminal has been encrypted according to the first bus terminal's public key.

Here, if the first bus terminal's public key and configuration information are not stored in the bus controller, then the first bus terminal's public key and configuration information may be obtained from the network side server.

Step 317: the first bus terminal obtains the configuration information corresponding to its identifier from the broadcast message according to its own identifier and private key and after the configuration is done based on the configuration information, sends to the bus controller response information which has been encrypted according to the bus controller's public key.

Subsequently, after the response information is received by the bus controller, the bus controller may perform a related process which follows described above in Step 304 and will be not repeatedly described herein.

Step 318: the bus controller allocates an identifier to the first bus terminal and sends the identifier encrypted by the first bus terminal's public key to the first bus terminal.

Step 319: after decrypting the allocated identifier by its own private key, the first bus terminal sends a request for the configuration information corresponding to the identifier to the bus controller.

Here, the request message has been encrypted according to the bus controller's public key.

Step 320: after the request information is decrypted by the bus controller with its own private key, the bus controller sends the configuration information to the bus terminal.

Here, the bus controller may send the identifier of the first bus terminal and the configuration information corresponding to the identifier of the first bus terminal in a broadcast message, and the configuration information corresponding to the identifier of the first bus terminal has been encrypted according to the first bus terminal's public key.

Step 321: the first bus terminal decrypts the configuration information by its own identifier and private key to obtain the configuration information corresponding to its identifier from the broadcast message, and after the configuration is done based on the configuration information, sends to the bus controller response information encrypted according to the bus controller's public key.

Subsequently, after the response information is received by the bus controller, the bus controller may perform a related process which also follows described above in Step 304 and will be not repeatedly described herein.

Figure 4B:
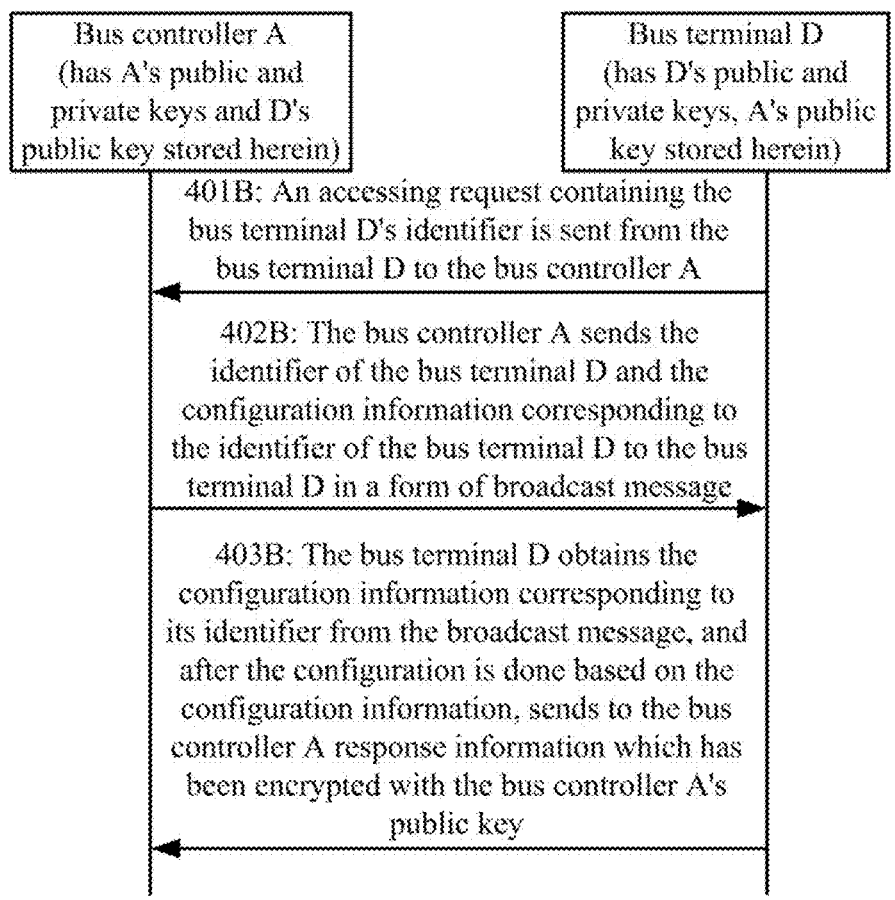
FIG. 4B shows a schematic diagram depicting a random access verification process according to an embodiment of the present invention.
Figure 4C:
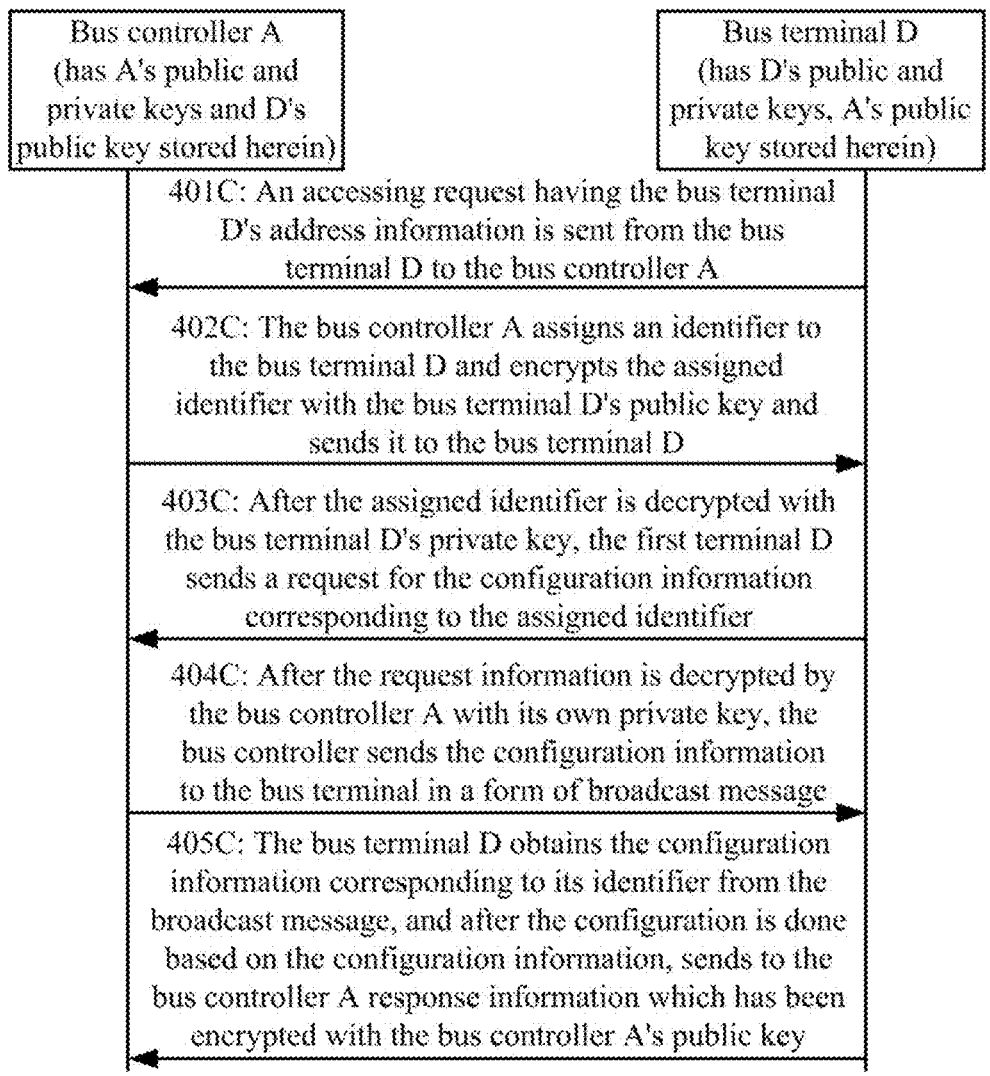
FIG. 4C shows a schematic diagram depicting the random access verification process according to another embodiment of the present invention.

Here, for convenience and ease of understanding of the embodiments of the present invention, the random access verification process described above in Steps 314 to 321 is exemplified, specifically with reference to FIGS. 4B and 4C.

Reference still can be made to the implementing system for the industrial Internet field broadband bus architecture shown in FIG. 4A, assuming that a bus terminal D is a bus terminal newly added to the system, where the bus terminal D may have D's public and private keys, A's public key pre-configured herein.

In a specific implementation, there may be two scenarios for the random access process of the bus terminal D. In the first one, the bus terminal D has pre-stored an identifier allocated by the bus controller A, and in the second one, no identifier allocated by the bus controller A has been pre-stored in the bus terminal D.

For the first scenario, reference may be made to the first schematic diagram of the random access verification process shown in FIG. 4B:

Step 401B: the bus terminal D sends an access request containing the bus terminal D's identifier to the bus controller A;

Step 402B: the bus controller A sends the identifier of the bus terminal D and the configuration information corresponding to the identifier of the bus terminal D to the bus terminal D in a broadcast message; and Step 403B: the bus terminal D obtains the configuration information corresponding to its identifier from the broadcast message based on its own identifier and private key, and after the configuration is done based on the configuration information, sends to the bus controller response information encrypted according to the bus controller A's public key.

Subsequently, after the response information is received by the bus controller A, the bus controller A may perform a related process which follows described above and will be not repeatedly described herein.

For the second scenario, reference may be made to the second schematic diagram of the random access verification process shown in FIG. 4C:

Step 401C: the bus terminal D sends an access request having the bus terminal D's address information to the bus controller A;

Step 402C: the bus controller A allocates an identifier to the bus terminal D and encrypts the allocated identifier by the bus terminal D's public key and sends the encrypted identifier to the bus terminal D;

Step 403C: after the allocated identifier is decrypted by the bus terminal D's private key, the first bus terminal D sends a request for the configuration information corresponding to the allocated identifier;

Step 404C: after the request information is decrypted by the bus controller A with its own private key, the bus controller sends the configuration information to the bus terminal in a broadcast message; here the configuration information corresponding to the identifier of the bus terminal D has been encrypted according to the bus terminal D's public key; and Step 405C: the bus terminal D obtains the configuration information corresponding to its identifier from the broadcast message based on its own identifier and private key, and after the configuration is done based on the configuration information, sends to the bus controller response information encrypted according to the bus controller A's public key.

Subsequently, after the response information is received by the bus controller A, the bus controller A may perform a related process which follows described above and will be not repeatedly described herein.

Until this point, the access verification process in which the first bus terminal requests for accessing the bus controller is completed. Subsequently, the first bus terminal that has accessed the bus controller may transmit data to or receive data from the bus controller. Moreover, during the data transmission, the acquisition verification and transport verification modes may be used to conduct the security detection. A specific reference may be made to the foregoing, and repeated description will not be given herein.

Here, it should be noted that, the random access verification in Steps 314-321, the acquisition verification in Steps 305-310 and the transport verification in Steps 311-313 may be specifically executed in any order.

In addition, during the random access verification process in Steps 314-321, the first bus terminal and the bus controller may interleave the to-be-sent data and de-interleave the received data, so as to improve the reliability of the data transmission. A specific reference may be made to the foregoing and repeated description will not be given.

The interleaving mode employed during the data transmission between a bus terminal and a bus controller according to an embodiment of the present invention will be described in detail, with respect to a specific embodiment.

Figure 5:
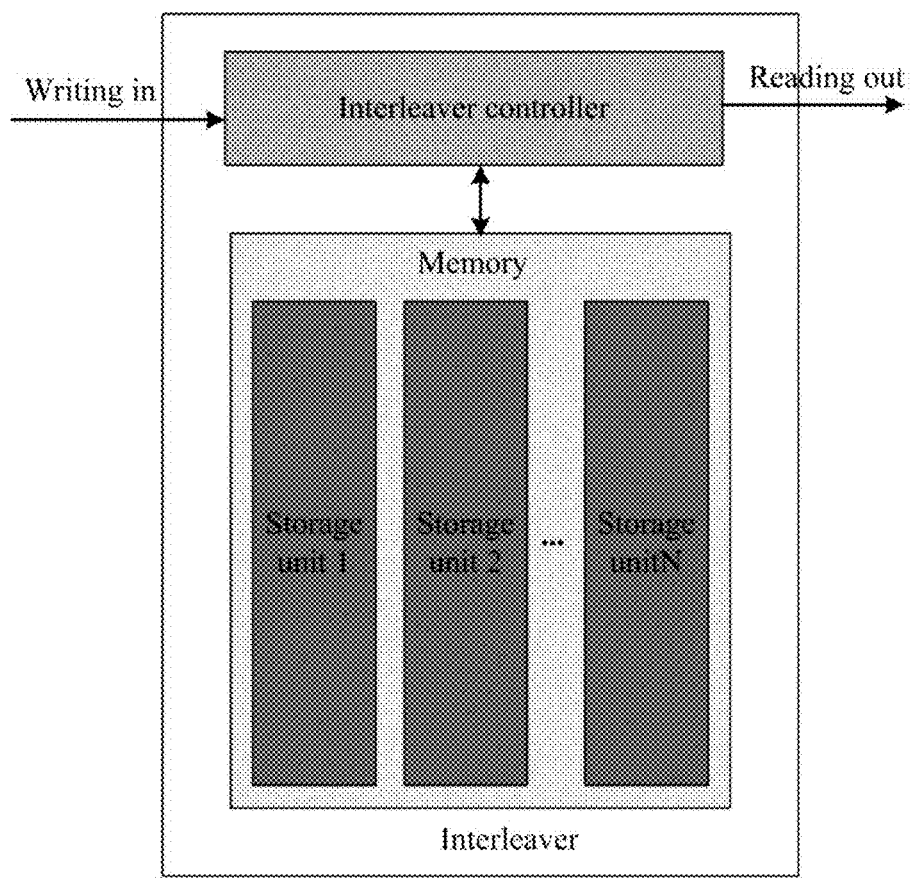
FIG. 5 shows an implementing architecture of an interleaver according to an embodiment of the present invention.

Reference is made to FIG. 5, which shows an implementation architecture of an interleaver according to an embodiment of the present invention. An interleaver may include an interleaver controller and a memory; where the memory may consist of N storage units (such as RAM), and N is a positive integer greater than 1, and the N RAMs may form an interleaver matrix. The interleaver controller may control writing and reading of the data in the interleaver matrix.

Here, to avoid the problem in which a series of bit loss in data sent from the sending end due to signal fading in the channel transport causes a failure to recognize complete data at the receiving end, the to-be-sent data may be interleaved by a pre-set interleaver at the sending end before the to-be-sent data is sent to the bus controller; where the sending end may refer to a bus terminal or a bus controller, and accordingly the receiving end may refer to the bus controller or the bus terminal.

Figures 6A, 6B:
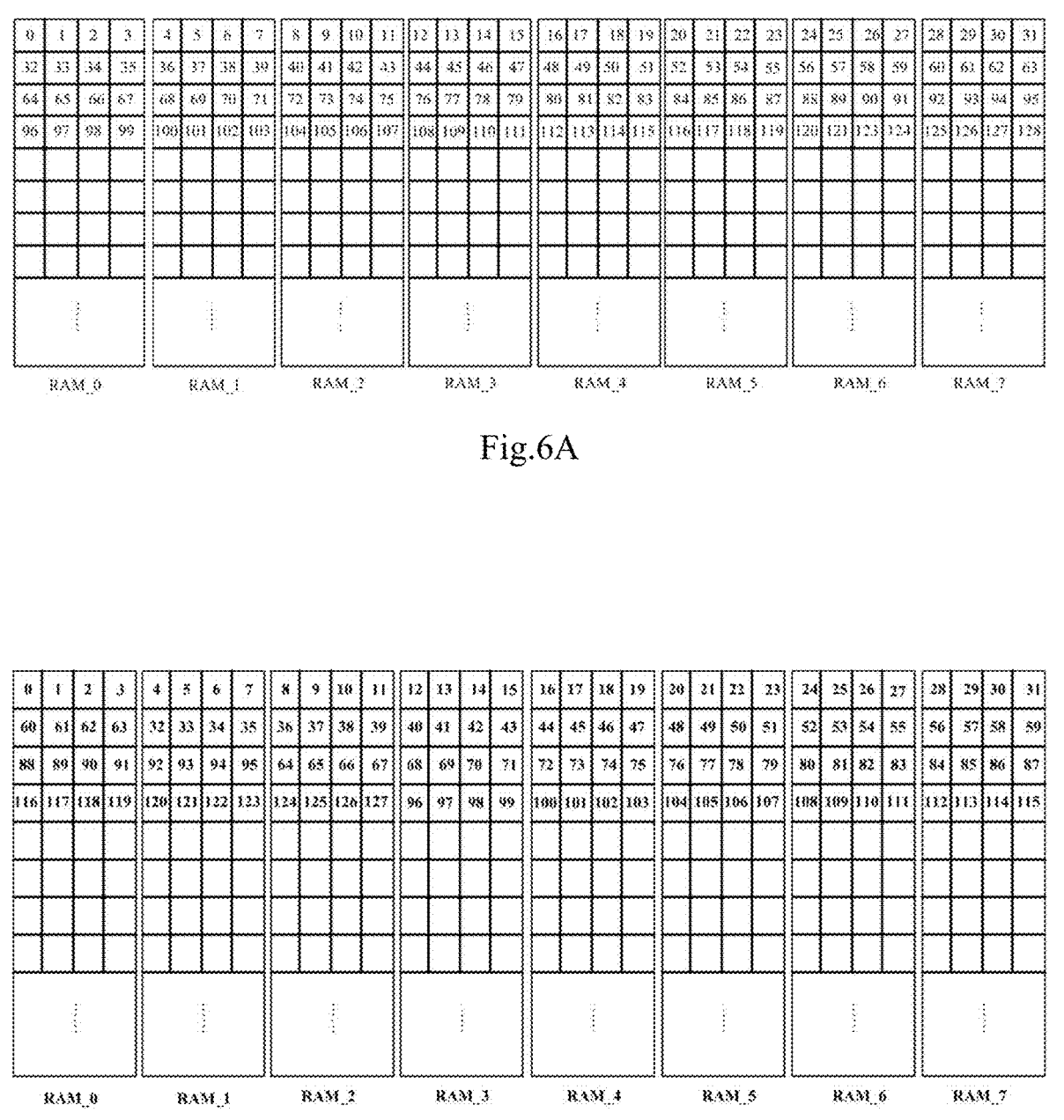

With reference to the first schematic diagram of the written data in each of storage units of the interleaver shown in FIG. 6A, a traditional interleaving process is discussed at first.

Taking an interleaver matrix consisting of eight 120*4 RAMs as an example, where there are 120 rows and 32 columns in the interleaver matrix. The numbers 0-31 represent the bits corresponding to the first row in the interleaver matrix respectively, and the numbers 32-63 represent the bits corresponding to the second row in the interleaver matrix respectively, here only part of the bits in each RAM are listed for example, and the rest may follow the number of the listed bits but will not be listed in the diagram.

In the traditional writing order, 4 bits of data are written into the RAM_0 to RAM_7 in sequence along a row within each clock cycle, and in the corresponding reading order, 4 bits of data are output from RAM_0 to RAM_7 in sequence along a column within each clock cycle. That is, the to-be-sent data are serially written into the corresponding bits in the order of (0, 1, 2, 3) (4, 5, 6, 7) . . . , and are serially output from the corresponding bits in the order of (0, 32, 64, 96) (1, 33, 65, 97) . . . during a reading process.

However, because for each RAM, only the data corresponding to one row of bits can be read once, when the data are read, for RAM_0 for example, if the data corresponding to (0, 32, 64, 96) are required to be output, then a row of data (0, 1, 2, 3) corresponding to bit number of 0, a row of data (32, 33, 34, 35) corresponding to bit number of 32 and so on need to be read in sequence, and thus such read operation needs to be performed four times to read out the to-be-sent data corresponding to the bits (0, 32, 64, 96). Therefore, during reading process, time delay of the data transmission may be increased.

In view of this, in an embodiment of the present invention, a first rule may be set in the interleaver controller, such that the to-be-sent data is controlled to be serially written into at least one storage unit of the interleaver according to the pre-set first rule. Specifically, the to-be-sent data of a set bit number which are output within each clock cycle may be written in sequence into different storage units. For example, with reference to the second schematic diagram of the written data in each of storage units of the interleaver shown in FIG. 6B, without change of the order in which the data are output, that is, under the case that the to-be-sent data are output from the corresponding bits in the order of (0, 32, 64, 96) (1, 33, 65, 97) . . . , the data may be staggered when the data are written.

With reference to FIG. 6B, take the output data corresponding to the four bits (0, 32, 64, 96) as an example. During writing process, the data corresponding to the bit number of 32 may be written into the second row of RAM_1, the data corresponding to the bit number of 64 may be written into the third row of RAM_2, and the data corresponding to the bit number of 96 may be written into the fourth row of RAM_3. In this way, the output data corresponding to the four bit numbers of (0, 32, 64, 96) may be guaranteed to written into different RAMs respectively.

Further, a second rule may be set in the interleaver controller, such that the to-be-sent data is controlled to be parallelly output from at least one storage unit according to the pre-set second rule. Specifically, within each clock cycle, the to-be-sent data of a set bit number are read respectively from the different storage units and the data corresponding to specified bit positions are extracted respectively from the data read from the different storage units and output.

With reference to the previous example, when the data are read, because the output data corresponding to four bit numbers of (0, 32, 64, 96) are respectively positioned in the different RAMs, a row of data (0, 1, 2, 3) corresponding to the bit number of 0, a row of data (32, 33, 34, 35) corresponding to the bit number of 32, a row of data (64, 65, 66, 67) corresponding to the bit number of 64 and a row of data (96, 97, 98, 99) corresponding to the bit number of 96 may be simultaneously read from RAM_0, RAM_1, RAM_2 and RAM_3 respectively. Further, the data corresponding to bit numbers of 0, 32, 64 and 96 can be extracted from the four rows of the read data and output.

It can be seen that in the method according to the embodiment of the present invention, data can be sent and received in a manner of interleaving and de-interleaving, thus improving the reliability of the data transmission between the bus terminals and the bus controller, while the to-be-sent data can be parallelly output from different storage units, so that the reading speed can be increased, and thus the throughout of the data transmission can be increased, therefore enabling the time delay of data transmission to be effectively reduced.

It should be noted that the above described embodiment is only illustrated for example, in a practical application, the number of bits of the written data within each clock cycle is not limited to 4, and may be set depending on a specific scenario. Moreover, for the writing process, when the to-be-sent data of a set bit number which are output within each pre-set clock cycle are written in sequence into different storage units, the different storage units herein may not necessarily refer to the successive storage units in the above described example, but may depend on actual demand, and no limitation is made thereto in the present application. Moreover, in a specific implementation, during the process of the bus terminal accessing the bus controller, the bus controller and the bus terminal may process the to-be-sent data by interleaving and de-interleaving respectively. A specific interleaving process may refer to the above described process, and will not described in detail herein.

Based on the same invention idea, an embodiment of the present invention further provides an apparatus for implementing security of broadband bus architecture in industrial Internet field, corresponding to the method for implementing security of broadband bus architecture in the industrial Internet field. Since the principle of solving the problems by the apparatus is the same as that of solving the problems by the method for implementing security of broadband bus architecture in the industrial Internet field according to the embodiments of the present invention, an implementation of the apparatus may follow the embodiments of the forgoing method, and no repeated description thereof is given.

Figure 7:
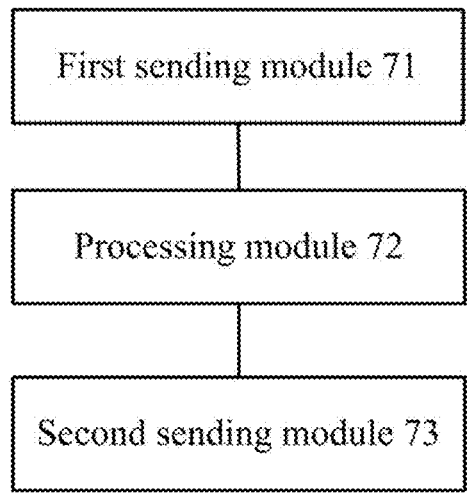
FIG. 7 shows a schematic structural diagram of an apparatus for implementing the security of broadband bus architecture in industrial Internet field according to an embodiment of the present invention.

Reference is made to FIG. 7, which is a structural diagram of an apparatus for implementing security of broadband bus architecture in industrial Internet field according to an embodiment of the present invention. The apparatus includes:

a first sending module 71, configured to send configuration information to a bus terminal, where the configuration information is encrypted according to pre-stored encryption information of the bus terminal;

a processing module 72, configured to receive response information which has been encrypted according to pre-stored encryption information of a bus controller from the bus terminal, and after the response information is decrypted according to the bus controller's own pre-stored decryption information and it is determined that the configuration is done for the bus terminal, allocate a channel resource block for data transmission to the bus terminal; where the response information is sent by the bus terminal after the bus terminal has decrypted the configuration information by its own decryption information and finished the configuration based on the configuration information; and a second sending module 73, configured to, based on the channel resource allocated to the bus terminal, send to-be-sent data which has been interleaved by a pre-set interleaver to the bus terminal; where the to-be-sent data are serially written into at least one storage unit of the interleaver according to a first rule and parallelly output from the at least one storage unit according to a pre-set second rule.

Further, the first sending module 71 is configured to:

send a broadcast message to at least one bus terminals, the broadcast message containing the identifiers of the at least one bus terminals and the configuration information corresponding to the identifiers of the at least one bus terminals;

where the configuration information for any bus terminal in the at least one bus terminals has been encrypted according to the pre-stored encryption information of the any bus terminal; the identifier of the any bus terminal is used to indicate the any bus terminal to obtain, based on the decryption information of the any bus terminal and the identifier of the any bus terminal, the configuration information corresponding to the identifier of the any bus terminal from the broadcast message.

Further, the processing module 72 is also configured to:

before the sending module sends the configuration information to the bus terminal, receive an access request which has been encrypted according to the encryption information of the bus controller and sent from the bus terminal; and after the access request is decrypted with the bus controller's own decryption information, allocate an identifier to the bus terminal if it is determined that no identifier for the bus terminal is included in the access request.

Further, the second sending module 73 is configured to:

write the to-be-sent data of a set bit number which are output within each pre-set clock cycle into different storage units in sequence.

The second sending module 73 is further configured to:

within each clock cycle, read the to-be-sent data of the set bit number respectively from the different storage units, extract data corresponding to specified bit positions respectively from the data read from the different storage units and output the extracted data.

Figure 8:
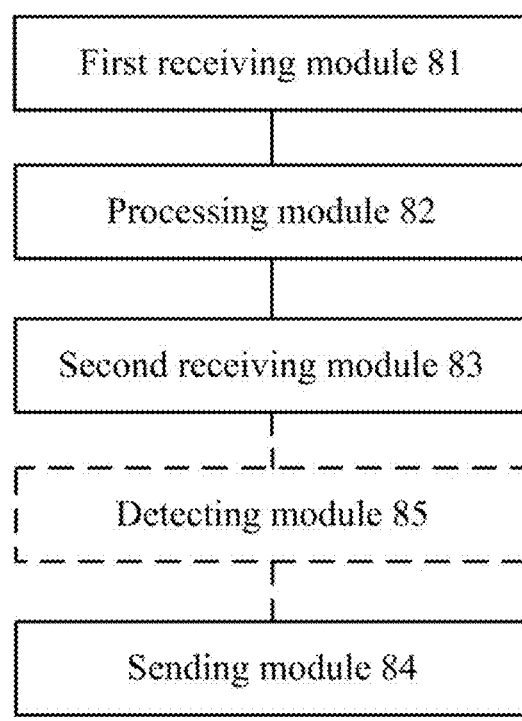
FIG. 8 shows a schematic structural diagram of an apparatus for implementing security of broadband bus architecture in industrial Internet field according to another embodiment of the present invention.

Reference is made to FIG. 8, which is a structural diagram of an apparatus for implementing security of an industrial Internet field broadband bus architecture according to an embodiment of the present invention. The apparatus includes:

a first receiving module 81, configured to receive configuration information sent from a bus controller, where the configuration information has been encrypted according to pre-stored encryption information of the bus terminal by the bus controller;

a processing module 82, configured to decrypt the configuration information according to its own pre-stored decryption information, and after finishing the configuration based on the configuration information, send to the bus controller response information encrypted according to pre-stored encryption information of the bus controller;

a second receiving module 83, configured to receive information of channel resource block which is allocated by the bus controller to the bus terminal; and the information of channel resource block is sent after the response information is decrypted by the bus controller's own pre-stored decryption information and it is determined that the configuration is done by the bus terminal; and a sending module 84, configured to, based on the received information of channel resource block, send to-be-sent data to the bus controller after the to-be-sent data are interleaved by a pre-set interleaver; where the to-be-sent data are serially written into at least one storage unit of the interleaver according to a first rule and parallelly output from the at least one storage unit according to a pre-set second rule.

Further, the apparatus further includes:

a detecting module 85, configured to detect acquired data during data acquisition.

The sending module 84 is configured to:

if the detecting module determines that the acquired data is normal data, based on the information of channel resource block, send the normal data which are interleaved by the pre-set interleaver to the bus controller;

if the detecting module determines that the acquired data is suspect data, mark the suspect data, and based on the information of channel resource block, send the marked suspect data which are interleaved by the pre-set interleaver to the bus controller; and if the detecting module determines that the acquired data are abnormal data, locally process the abnormal data.

Further, the detecting module 85 is configured to:

if data transmission is performed between the bus terminal and the bus controller and between respective bus terminals based on Orthogonal Frequency Division Multiplexing (OFDM) technology, monitor the sub-carriers occupied by the bus terminal and other bus terminals during the data transmission;

The sending module 84 is configured to:

if the detecting module determines that any of the other bus terminals occupies the same sub-carrier as the bus terminal or at least two of the other bus terminals occupy the same sub-carrier during the data transmission, send alert information interleaved by the pre-set interleaver to the bus controller, where the alert information is used to notify the bus controller that an abnormality occurs during the current data transmission.

Further, the sending module 84 is configured to:

write into different storage units in sequence a set bit number of to-be-sent data which are output within each pre-set clock cycle; and The sending module 84 is further configured to:

within each clock cycle, read respectively the set bit number of to-be-sent data from the different storage units, extract the data corresponding to specified bit positions respectively from the data read from the different storage units and output the extracted data.

An embodiment of the present invention further provides a computer-readable storage medium having a computer program stored thereon, the computer program, when executed by a processor, implementing the steps of any of the methods for implementing security of broadband bus architecture in the industrial Internet field at a bus controller side, according to any of the foregoing method embodiments.

An embodiment of the present invention further provides a computer device, the computer device includes a processor, the processor is configured to, when executing the computer program stored in a memory, implementing the steps of any of the methods for implementing security of broadband bus architecture in the industrial Internet field at a bus controller side, according to any of the foregoing method embodiments.

An embodiment of the present invention further provides a computer-readable storage medium having a computer program stored thereon, the computer program, when executed by a processor, implementing the steps of any of the methods for implementing security of broadband bus architecture in the industrial Internet field at a bus terminal side, according to any of the foregoing method embodiments.

An embodiment of the present invention further provides a computer device, the computer device includes a processor, the processor is configured to, when executing the computer program stored in a memory, implementing the steps of any of the methods for implementing security of broadband bus architecture in the industrial Internet field at a bus terminal side, according to any of the foregoing method embodiments.

In view of the above, in the embodiments of the present invention, during the process of the bus terminal accessing the bus controller, access verification is introduced. The data transmitted between the bus terminals and the bus controller are encrypted, so that the security of the access process can be guaranteed. Further, after the bus terminal accesses the bus controller, the bus terminal can detect acquired data by acquisition verification and determine the mode in which data is processed according to a result of analyzing the detection, so as to prevent the operation of the entire system from threat of the abnormal data. Moreover, the bus terminals may also employ transport verification to monitor the transmission rule of a data flow over the bus, such as, the rule in which each bus terminal is allocated a sub-carrier in the OFDM, and report an abnormity condition in time to the bus controller after an abnormity in the transmission rule of the data flow is detected, so that the abnormal condition of the transmission rule can be treated by the bus controller. According to the foregoing, the security may be improved during the data transmission between the bus terminals and the bus controller.

Moreover, in the embodiments of the present invention, an interleaver are pre-set respectively in the bus terminals and the bus controller. When data transmission is performed between the bus controller and the bus terminals based on the allocated channel resource block, the to-be-sent data may be interleaved by the interleavers before the data are sent. In this way, by changing the structure of the to-be-sent data, the concentrated errors that abruptly occur during data transmission may be discretized to the full extend, so that the problem that the receiving end fails to recognize full data because of a series of bit loss in the data sent from the sending end due to signal fading can be avoided and thus the reliability of the data transmission between the bus terminals and the bus controller is effectively improved. Moreover, during the interleaving process for the to-be-sent data at the bus controller or the bus terminals, the to-be-sent data can be serially written into at least one storage unit of the interleaver, and parallelly output from the at least one storage unit. Such manner in which the to-be-sent data are parallelly output from the interleaver can also effectively improve the throughput rate during data transmission, and reduce the time delay of the data transmission resulting from the addition of the interleaving processes, thus guaranteeing high-speed data transmission between the bus terminals and the bus controller.

It should be understood to those skilled in the art that the embodiments of the present invention may be provided as a method, a system, or a computer program product. Accordingly, the present invention may take the form of an entirely hardware embodiment, an entirely software embodiment or an embodiment combining software and hardware aspects. Moreover, the present application may take the form of one or more computer program product embodied in one or more computer readable medium(s) (including but not limited to, disk storage, CD-ROM, optical memory, etc.) having computer usable program code embodied thereon.

The present invention is described with reference to the flowchart and/or block diagrams of the method, device (system) and computer program product according to the embodiments of the present invention. It should be understood that each of the processes and/or blocks in the flowchart and/or block diagram and a combination of the processes and/or blocks in the flowchart and/or block diagram may be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instruction means which implement the function specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions specified in the flowchart and/or block diagram block or blocks.

While the present invention has been described with preferred embodiments, those skilled in the art from the underlying inventive concept can make other modifications and variations to these embodiments. Therefore, the appended claims are intended to explain embodiments including the preferred embodiment as fall within the scope of this application and all changes and modifications.

Obviously, those skilled in the art can make various modifications and variations to the embodiments of the present invention without departing from the spirit and scope of the embodiments of the present invention. Thus, if these modifications and variations to the embodiments of the present invention fall within the claims of the present invention and the scope of equivalents thereof, the present invention is intended to include these modifications and variations.

The invention claimed is:

1. A method for implementing security of broadband bus architecture in industrial internet field, comprising:
   sending, by a bus controller, configuration information to a bus terminal, wherein the configuration information is encrypted according to pre-stored encryption information of the bus terminal;
   receiving, by the bus controller, response information which is sent from the bus terminal and is encrypted according to pre-stored encryption information of the bus controller, and after decrypting the response information according to pre-stored decryption information of the bus controller and determining that the bus terminal finishes configuration, allocating a channel resource block for data transmission to the bus terminal, wherein the response information is sent by the bus terminal after the bus terminal decrypts the configuration information according to decryption information of the bus terminal and finishes the configuration according to the configuration information; and
   sending, by the bus controller, to-be-sent data interleaved by a pre-set interleaver to the bus terminal, according to the channel resource block allocated to the bus terminal, wherein the to-be-sent data are serially written into at least one storage unit of the interleaver according to a pre-set first rule and parallelly output from the at least one storage unit according to a pre-set second rule.

2. The method according to claim 1, wherein sending, by a bus controller, configuration information to a bus terminal comprises:
   sending, by the bus controller, a broadcast message to at least one bus terminal, the broadcast message comprising an identifier of the at least one bus terminal and configuration information corresponding to the identifier of the at least one bus terminal;
   wherein configuration information for one of the at least one bus terminal is encrypted according to pre-stored encryption information of the one bus terminal; an identifier of the one bus terminal is used to indicate the one bus terminal to obtain, according to decryption information of the one bus terminal and the identifier of the one bus terminal, the configuration information corresponding to the identifier of the one bus terminal from the broadcast message.

3. The method according to claim 2, wherein before sending, by the bus controller, the configuration information to the bus terminal, the method further comprises:
   receiving, by the bus controller, an access request sent by the bus terminal and encrypted according to the encryption information of the bus controller; and
   after decrypting the access request according to the decryption information of the bus controller, allocating, by the bus controller, an identifier to the bus terminal if it is determined that the access request does not comprise the identifier of the bus terminal.

4. The method according to claim 1, wherein the operation that the to-be-sent data are serially written into the at least one storage unit of the interleaver according to the pre-set first rule comprises:
   writing a set bit number of to-be-sent data which are output within each pre-set clock cycle into different storage units in sequence;
   the operation that the to-be-sent data are parallelly output from the at least one storage unit according to the pre-set second rule comprises:
   within each clock cycle, reading the set bit number of to-be-sent data respectively from the different storage units, extracting data corresponding to specified bit positions respectively from the data read from the different storage units and outputting the extracted data.

5. A method for implementing security of broadband bus architecture in industrial internet field, comprising:
   receiving, by a bus terminal, configuration information sent from a bus controller, wherein the configuration information is encrypted by the bus controller according to pre-stored encryption information of the bus terminal;
   decrypting, by the bus terminal, the configuration information according to pre-stored decryption information of the bus terminal, and after finishing configuration according to the configuration information, sending, by the bus terminal, to the bus controller response information encrypted according to pre-stored encryption information of the bus controller;
   receiving, by the bus terminal, information of channel resource block which is allocated by the bus controller to the bus terminal, wherein the information of channel resource block is sent by the bus controller after the bus controller decrypts the response information according to pre-stored decryption information of the bus controller and determines that the bus terminal finishes the configuration; and
   sending, by the bus terminal, to-be-sent data interleaved by a pre-set interleaver to the bus controller, according to the received information of channel resource block, wherein the to-be-sent data are serially written into at least one storage unit of the interleaver according to a pre-set first rule and parallelly output from the at least one storage unit according to a pre-set second rule.

6. The method according to claim 5, wherein sending, by the bus terminal, the to-be-sent data interleaved by the pre-set interleaver to the bus controller according to the received information of channel resource block, comprises:
   detecting, by the bus terminal, acquired data during data acquisition;
   if the acquired data is determined as normal data, sending normal data which are interleaved by the pre-set interleaver to the bus controller, based on the information of channel resource block;
   if the acquired data is determined as suspect data, marking the acquired suspect data, and sending the marked suspect data which are interleaved by the pre-set interleaver to the bus controller based on the information of channel resource block; and
   if the acquired data is determined as abnormal data, locally processing the acquired abnormal data.

7. The method according to claim 5, wherein sending, by the bus terminal, the to-be-sent data interleaved by the pre-set interleaver to the bus controller based on the received information of channel resource block, comprises:
   if data transmission is performed between the bus terminal and the bus controller and between respective bus terminals based on Orthogonal Frequency Division Multiplexing, OFDM, technology, monitoring, by the bus terminal, sub-carriers occupied by the bus terminal and other bus terminals during the data transmission; and
   if it is determined that any of the other bus terminals occupies a same sub-carrier as the bus terminal or at least two of the other bus terminals occupy a same sub-carrier during the data transmission, sending alert information interleaved by the pre-set interleaver to the bus controller, wherein the alert information is used to notify the bus controller that an abnormality occurs during current data transmission.

8. The method according to claim 5, wherein the to-be-sent data are serially written by the bus terminal into at least one storage unit of the interleaver according to following rule:
   a set bit number of to-be-sent data which are output within each pre-set clock cycle are written in sequence into different storage units; and
   the to-be-sent data are parallelly output by the bus terminal from the at least one storage unit according to following rule:
   within each clock cycle, the set bit number of to-be-sent data are read respectively from the different storage units and data corresponding to specified bit positions are extracted respectively from the data read from the different storage units and output.

9. An apparatus for implementing security of broadband bus architecture in industrial internet field, comprising:
   one or more processors; and
   a memory, wherein one or more computer readable program codes are stored in the memory, and the one or more processors are configured to execute the one or more computer readable program codes to perform:
sending configuration information to a bus terminal, wherein the configuration information is encrypted according to pre-stored encryption information of the bus terminal;
receiving response information which is sent from the bus terminal and is encrypted according to pre-stored encryption information of a bus controller, and after the response information is decrypted according to pre-stored decryption information of the bus controller and it is determined that the bus terminal finishes configuration, allocating a channel resource block for data transmission to the bus terminal, wherein the response information is sent by the bus terminal after the bus terminal decrypts the configuration information according to decryption information of the bus terminal and finishes the configuration according to the configuration information; and
sending to-be-sent data interleaved by a pre-set interleaver to the bus terminal, according to the channel resource block allocated to the bus terminal, wherein the to-be-sent data are serially written into at least one storage unit of the interleaver according to a pre-set first rule and parallelly output from the at least one storage unit according to a pre-set second rule.

10. The apparatus according to claim 9, wherein the operation of sending configuration information to a bus terminal comprises:
sending a broadcast message to at least one bus terminal, the broadcast message comprising an identifier of the at least one bus terminal and configuration information corresponding to the identifier of the at least one bus terminal;
wherein configuration information for one of the at least one bus terminal is encrypted according to pre-stored encryption information of the one bus terminal; an identifier of the one bus terminal is used to indicate the one bus terminal to obtain, according to decryption information of the one bus terminal and the identifier of the one bus terminal, the configuration information corresponding to the identifier of the one bus terminal from the broadcast message.

11. The apparatus according to claim 10, wherein before sending, by the bus controller, the configuration information to the bus terminal, the one or more processors are further configured to execute the one or more computer readable program codes to perform:
receiving an access request sent from the bus terminal and encrypted according to the encryption information of the bus controller; and
after the access request is decrypted according to the the decryption information of the bus controller, allocating an identifier to the bus terminal if it is determined that the access request does not comprise the identifier of the bus terminal.

12. The apparatus according to claim 9, wherein the operation that the to-be-sent data are serially written into the at least one storage unit of the interleaver according to the pre-set first rule comprises:
writing a set bit number of to-be-sent data which are output within each pre-set clock cycle into different storage units in sequence; and
the operation that the to-be-sent data are parallelly output from the at least one storage unit according to the pre-set second rule comprises:
within each clock cycle, reading the set bit number of to-be-sent data respectively from the different storage units, extracting data corresponding to specified bit positions respectively from the data read from the different storage units and outputting the extracted data.

13. An apparatus for implementing security of broadband bus architecture in industrial internet field, comprising:
one or more processors; and
a memory,
wherein one or more computer readable program codes are stored in the memory, and the one or more processors are configured to execute the one or more computer readable program codes to perform:
receiving configuration information sent from a bus controller, wherein the configuration information is encrypted by the bus controller according to pre-stored encryption information of the bus terminal;
decrypting the configuration information according to pre-stored decryption information of the bus terminal, and after the configuration is finished according to the configuration information, sending to the bus controller response information encrypted according to pre-stored encryption information of the bus controller;
receiving information of channel resource block which is allocated by the bus controller to the bus terminal, wherein the information of channel resource block is sent by the bus controller after the bus controller decrypts the response information according to pre-stored decryption information of the bus controller and determines that the bus terminal finishes the configuration; and
sending to-be-sent data interleaved by a pre-set interleaver to the bus controller, according to the received information of channel resource block, wherein the to-be-sent data are serially written into at least one storage unit of the interleaver according to a pre-set first rule and parallelly output from the at least one storage unit according to a pre-set second rule.

14. The apparatus according to claim 13, wherein the operation of sending the to-be-sent data interleaved by the pre-set interleaver to the bus controller according to the received information of channel resource block, comprises:
detecting acquired data during data acquisition; and
if the detecting module determines that the acquired data is normal data, sending normal data which are interleaved by the pre-set interleaver to the bus controller, based on the information of channel resource block;
if the detecting module determines that the acquired data is suspect data, marking the acquired suspect data, and sending the marked suspect data which are interleaved by the pre-set interleaver to the bus controller based on the information of channel resource block; and
if the detecting module determines that the acquired data are abnormal data, locally processing the abnormal data.

15. The apparatus according to claim 13, wherein the operation of sending the to-be-sent data interleaved by the pre-set interleaver to the bus controller based on the received information of channel resource block, comprises:
if data transmission is performed between the bus terminal and the bus controller and between respective bus terminals based on Orthogonal Frequency Division Multiplexing, OFDM, technology, monitoring sub-carriers occupied by the bus terminal and other bus terminals during the data transmission;

if it is determined that any of the other bus terminals occupies a same sub-carrier as the bus terminal or at least two of the other bus terminals occupy a same sub-carrier, sending alert information interleaved by the pre-set interleaver to the bus controller, wherein the alert information is used to notify the bus controller that an abnormality occurs during the current data transmission.

16. The apparatus according to claim 13, wherein the to-be-sent data are serially written by the bus terminal into at least one storage unit of the interleaver according to following rule:

writing a set bit number of to-be-sent data which are output within each pre-set clock cycle into different storage units in sequence; and the to-be-sent data are parallelly output by the bus terminal from the at least one storage unit according to following rule:

within each clock cycle, reading the set bit number of to-be-sent data respectively from the different storage units, extracting data corresponding to specified bit positions respectively from the data read from the different storage units and outputting the extracted data.

* * * * *